Nov. 1, 1955 J. MICHAL ET AL 2,722,675

PULSE COUNTING SYSTEM

Filed March 16, 1953 2 Sheets-Sheet 1

INVENTORS J. MICHAL
R. E. STAEHLER
BY C. Mattice
ATTORNEY

PULSE COUNTING SYSTEM

Filed March 16, 1953 2 Sheets-Sheet 2

INVENTORS J. MICHAL
R. E. STAEHLER
BY C. Mallice
ATTORNEY

United States Patent Office 2,722,675
Patented Nov. 1, 1955

2,722,675

PULSE COUNTING SYSTEM

Joseph Michal, New Hyde Park, and Robert E. Staehler, Ridgewood, N. Y., assignors to Bell Telephone Laboratories, Incorporated, New York, N. Y., a corporation of New York Application March 16, 1953, Serial No. 342,538

5 Claims. (Cl. 340—168)

This invention relates to telephone systems and has for its object greater economy in the common control equipment used in automatic switching systems.

More specifically, a feature of the invention lies in the provision of a counting relay arrangement employing a minimum number of relays, so operated and connected that, in addition to counting the usual ten pulses, a positive indication will be given if more than ten pulses are received.

The invention will be more clearly understood from a consideration of the following description read in connection with the drawing in which.

Figure 1:
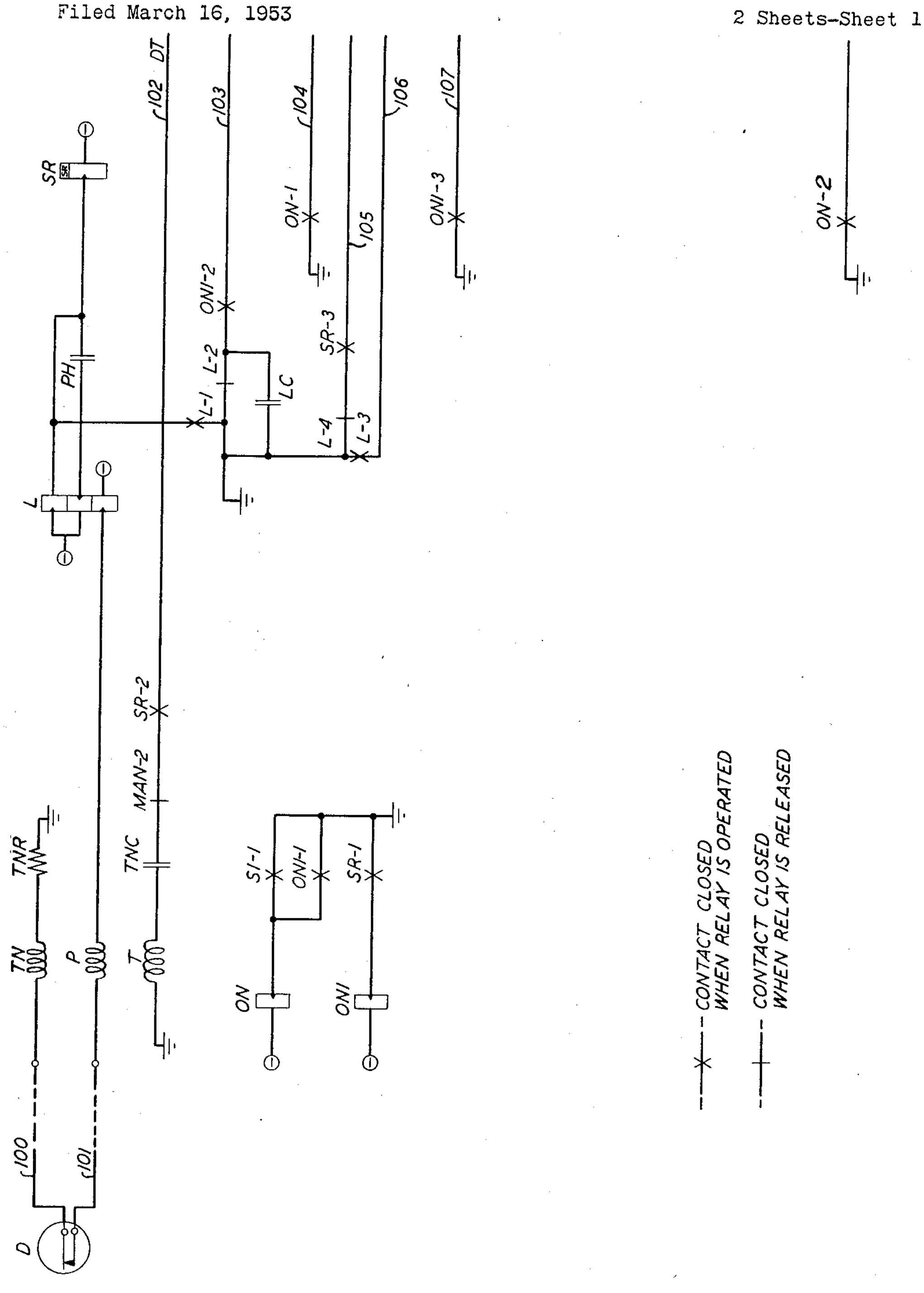
Fig. 1 shows the dial pulsing circuit.
Figure 2:
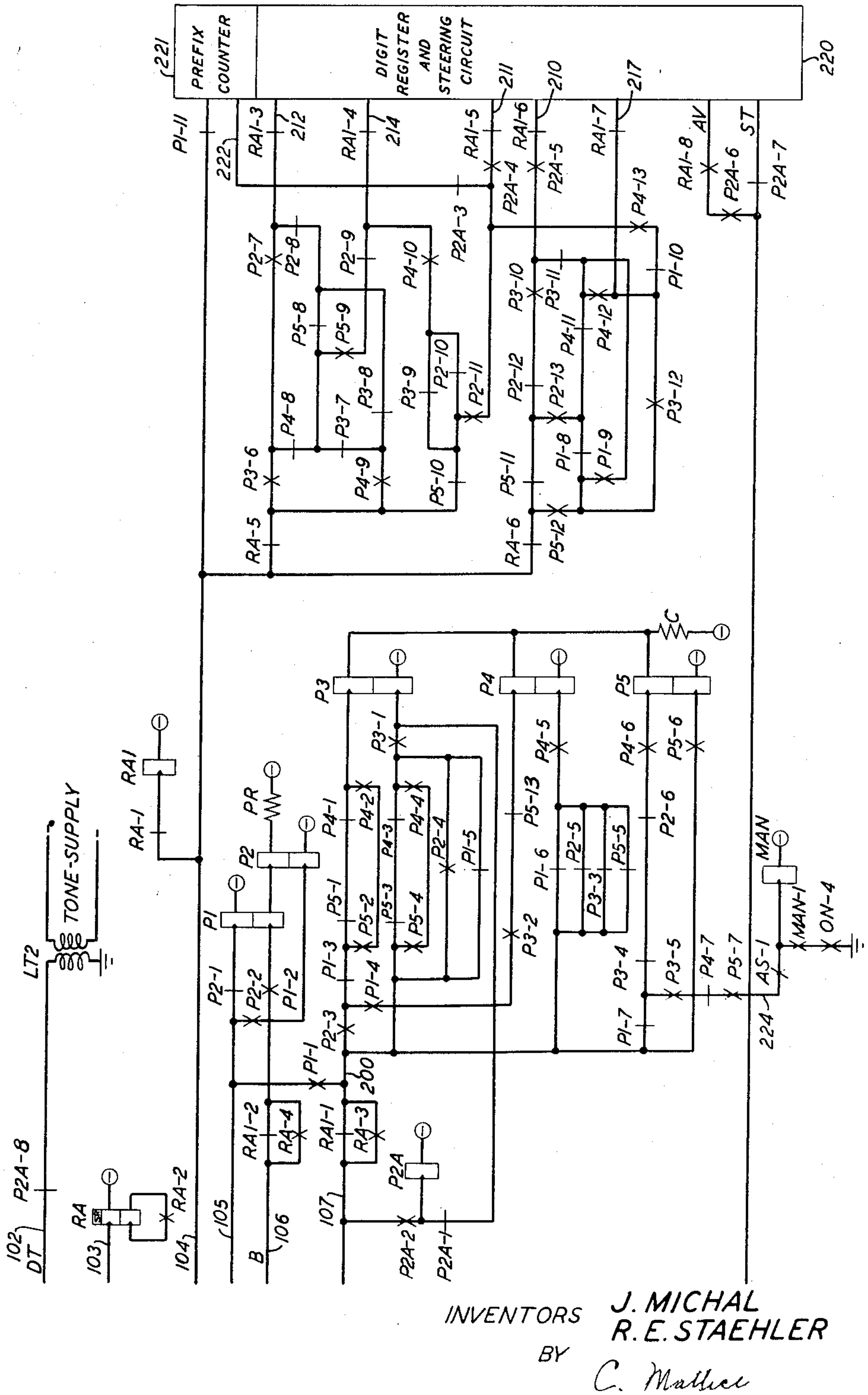
Fig. 2 shows the counting relay circuit.

This dial pulse counting arrangement is especially designed for use in the subscriber register of a cross bar switching telephone system such as shown in United States Patent 2,585,904, granted to A. J. Busch, February 19, 1952.

In the drawing, the relay contacts are shown detached from the relay windings. The relay windings are given letter designations, while the associated contacts are identified by the same letter designation followed by a numerical designation identifying the individual contact. Contacts which are closed when the relay is deenergized are represented by a single short line perpendicular to the lines representing the connecting conductors, while contacts which are closed when the relay is operated are represented by a cross or X crossing the connecting conductors.

In the counting of ten pulses as required by the standard telephone dial, there are a maximum of twenty events to be recognized, namely ten breaks of the dial contact followed by ten closures or makes. From a mathematical consideration the minimum number of ordinary two-position relays with which it is possible to recognize these twenty events is five. Where it is desired to operate a five-relay register from the counting relays in accordance with the two-out-of-five code, the precise order of operating the relays and the economical use of the relay contacts become a difficult problem. The present solution to this problem is the result of the application of Boolean algebra to the problem.

Referring now to the drawing, dial D located at a calling subscriber station is shown connected over line conductors 100 and 101 with the windings TN and P of a tone coil included in a subscriber register. This circuit is set up, in response to the initiation of a call at the subscriber station, by switching means indicated but not shown. Winding TN is connected through resistance TNR to ground, while winding P is connected through the lower winding of relay L to battery. Relay L operates in this circuit, closing its contacts L–1 and L–3 and opening contacts L–2 and L–4. The closure of contact L–1 completes a biasing circuit for relay L through its upper winding and also establishes an operating circuit for relay SR. Relay SR operates and closes contacts SR–1, SR–2 and SR–3. With relay SR operated, a circuit is closed from ground through the left winding of repeating coil LT2, contact P2A–8, conductor 102, contact SR–2, contact MAN–2, condenser TNC, through a third winding T of the tone coil to ground. Tone supplied to the right winding of coil LT2 is induced into the above-traced circuit and is transmitted from winding T to windings TN and P to furnish dial tone to the calling subscriber.

During the operation of the switching means by which relay L was connected to the calling line, relay S1 (not shown) was operated, closing contact S1–1 to operate off-normal relay ON. Reday ON closes contacts ON–1, ON–2 and ON–4. Relay SR, in closing its contact SR–1, completes a circuit for operating secondary off-normal relay ON1. Relay ON1 operates, closing contacts ON1–1, ON1–2 and ON1–3. Relay ON1, at contact ON1–1, completes a holding circuit for relay ON. Contact ON–1 connects ground to conductor 104, completing a circuit over contact RA–1 to battery through the winding of relay RA1, operating the latter relay. Relay RA1, in operating, opens contacts RA1–1 to RA1–7 and closes contact RA1–8.

The structure of relay L is preferably, but not necessarily, of the mercury contact type similar to the structure of the mercury contact relay disclosed in Patent 2,577,602 of December 4, 1951, to E. T. Burton. The armatures, or armature, of relay L are biased to normally close the contacts L–1 and L–3. This bias, as in the type of relay disclosed by Burton, may be both partly mechanical due to the usual spring and partly magnetic due to the presence of a permanent magnet, if desired, influencing contacts L–1 and L–3. When relay L is operated, under closed loop conditions, the current flow over contact L–1 and through the upper winding is arranged to counteract partly the effect of the current flowing through the lower winding. This, in effect, increases the total bias tending to release the armatures when relay L is operated. This is to improve the releasing response of relay L, thereby aiding its performance under line conditions which tend to retard the release of relay L. The purpose of the middle winding in series with condenser PH is well known to provide a measure of pulse correction action, as described for instance in Patent 2,029,723 to L. H. Johnson and F. K. Low of February 4, 1936.

In response to the dial tone, the subscriber will dial the number of the wanted line. The first digit of a subscriber's designation may be any digit other than 1 or 0, but for convenience in describing the operation of the counting circuit it will be assumed that the dial D is operated to transmit a series of ten pulses corresponding to the digit 0. At the first opening of the dial contact, relay L releases, opening contacts L–1 and L–3 and closing contacts L–2 and L–4. The opening of contact L–1 opens the circuit of relay SR, but that relay is slow to release and remains operated over the times when relay L is released by dial pulses. With relay ON1 operated, a circuit is now closed from ground over contact L–2, contact ON1–2, conductor 103 to battery through the upper winding of relay RA. Relay RA operates in this circuit closing contacts RA–2, RA–3 and RA–4 and opening contacts RA–1, RA–5 and RA–6. At its contact RA–2 it short-circuits its lower winding to make it slow to release so that it will remain operated during the interruptions of its circuit by the reoperation of relay L between the dial pulses of a digit. With contact RA–1 opened, relay RA1 releases and remains released throughout the digit.

With relay SR operated, a circuit is closed from ground over contact L–4, contact SR–3, conductor 105, contact P2–1, upper winding of relay P1 to battery. Relay P1 operates in this circuit, closing a locking circuit for itself from battery through its upper winding, contact P2–1, contact P1–1, conductor 200, either over contact RA1–1 or over contact RA–3, conductor 107, contact ON1–3 to ground. Relay P1 also closes contacts P1–2, P1–4 and P1–9 and opens contacts P1–3, P1–5, P1–6, P1–7, P1–8, P1–10 and P1–11. At its contact P1–2 it prepares a circuit from battery through resistance PR, upper winding of relay P2, lower winding of relay P1, contact P1–2, either over contact RA1–2 or over contact RA–4 to conductor 106.

When relay L reoperates at the end of the first interruption, this latter circuit is extended to ground over contact L–3 operating relay P2. Relay P2, in operating, closes contacts P2–2, P2–3, P2–4, P2–7, P2–11 and P2–13 and opens contacts P2–1, P2–5, P2–6, P2–8, P2–9, P2–10 and P2–12. Relay P2 locks in a circuit from battery through its lower winding, contact P2–2, contact P1–1 to ground over conductor 200 as above traced. At its contact P2–1, relay P2 opens the locking circuit of relay P1 but that relay remains operated in the operating circuit for relay P2.

When relay L releases in response to the second pulse, the operating circuit for relay P1 is open at contact P2–1 and the holding circuit for relay P1 is opened at contact L–3 so that relay P1 now releases. The operating circuit of relay P2 is also opened, but since relay L closes contact L–4 before relay P1 opens contact P1–1, relay P2 is held operated in a circuit from battery through its lower winding, contact P2–2, conductor 105, contact SR–3 and contact L–4 to ground. When relay L reoperates at the end of the second pulse, this holding circuit for relay P2 is opened and relay P2 releases. With relay P2 released, the operating circuit of relay P1 is reclosed and the above operations will be repeated. From the foregoing it will be apparent that following the first and other odd pulses, relays P1 and P2 are operated and, following the second and other even pulses, relays P1 and P2 are released.

During the second pulse when relay P2 is held operated and relay P1 released, a circuit is closed from battery through resistance C, upper winding of relay P3, contact P4–1, contact P5–1, contact P1–3, contact P2–3 to ground on conductor 200. Relay P3 operates, closing contacts P3–1, P3–2, P3–5, P3–6, P3–10 and P3–12 and opening contacts P3–3, P3–4, P3–7, P3–8, P3–9 and P3–11. Relay P3 closes a holding circuit for itself from battery through its lower winding, over its contact P3–1 and thence in parallel over contacts P4–3 and P5–3, or over contact P2–4, or over contact P1–5 to ground on conductor 200. A circuit is also closed from ground on the locking circuit of relay P3 over contact P2A–1 to battery through the winding of relay P2A to indicate that at least two pulses have been received. Relay P2A operates and closes contacts P2A–2, P2A–4, P2A–5 and P2A–6 and opens contacts P2A–1, P2A–3, P2A–7 and P2A–8, locking over its contact P2A–2 to ground on conductor 107, thereby remaining operated until the subscriber register returns to normal. Relay P2A, in opening its contact P2A–1, disconnects its winding from the locking circuit of relay P3.

With relay P3 operated, when relays P1 and P2 are next both operated which occurs following the third pulse, a circuit is closed from battery through resistance C, upper winding of relay P4, contact P5–13, contact P3–2, contact P1–4, contact P2–3 to ground on conductor 200. Relay P4 operates in this circuit, closing contacts P4–2, P4–4, P4–5, P4–6, P4–9, P4–10, P4–12 and P4–13 and opening contacts P4–1, P4–3, P4–7, P4–8 and P4–11. At its contact P4–5, it closes a locking circuit for itself from battery through its lower winding, contact P4–5, contact P5–5 to ground over conductor 200. Relay P4 opens the operating circuit and one branch of the locking circuit of relay P3 but the latter relay remains locked over contact P2–4 and, when relay P1 releases in response to the fourth pulse, over contact P1–5 thereby remaining operated until the beginning of the fifth pulse.

With relay P4 operated, relay P3 cannot reoperate when relay P1 releases during the sixth pulse and, when both relays P1 and P2 are released at the end of the sixth pulse, a circuit is closed from battery through resistance C, upper winding of relay P5, contact P4–6, contact P2–6, contact P3–4, contact P1–7 to ground over conductor 200. Relay P5 operates, closing contacts P5–2, P5–4, P5–6, P5–7, P5–9 and P5–12 and opening contacts P5–1, P5–3, P5–5, P5–8, P5–10, P5–11 and P5–13. At its contact P5–6, it closes a locking circuit for itself from battery through its lower winding, contact P5–6 to ground on conductor 200 thereby remaining operated until the end of the digit. At its contacts P5–1 and P5–3, relay P5 further opens the previously traced operating and locking circuits of relay P3, but at its contacts P5–2 and P5–4, relay P5 prepares new operating and holding circuits for relay P3. At its contact P5–5, relay P5 opens the previously traced locking circuit for relay P4, but with relays P1, P2 and P3 released, relay P4 remains locked over contact P1–6, contact P2–5 or contact P3–3.

Relay P1 is again operated at the beginning of the seventh pulse and relay P2 is operated at the end of that pulse. At the beginning of the eighth pulse, relay P1 is released and a circuit is now closed from battery through resistance C, upper winding of relay P3, contact P4–2, contact P5–2, contact P1–3, contact P2–3 to ground on conductor 200, operating relay P3 which locks in a circuit from battery through its lower winding, contact P3–1, contact P4–4, contact P5–4 to ground on conductor 200.

With relay P3 operated, when relays P1 and P2 reoperate at the end of the ninth pulse, the last branch of the locking circuit of relay P4 is opened and that relay releases. With relay P4 released, the above-traced locking circuit for relay P3 is opened but that relay is held operated over contact P2–4 until the beginning of the tenth pulse and over contact P1–5 until the end of the tenth pulse. This completes the counting of the digit 0.

However, if additional pulses are received, for example due to some faulty cross-connection such as a cross-connection with a line to which ringing current is being applied, relays P1 and P2 will continue their cycles of operation. The operation of relay P1, at the beginning of an eleventh pulse, will release relay P3. Since relay P5 is operated, relay P4 cannot reoperate and in turn relay P3 cannot reoperate and the circuit remains in this condition until the pulsing stops or the register is released, with relays P1 and P2 alternately operated and released.

Following is a table showing the sequence pattern in which relays P1 to P5 operate. In this table, O is used to indicate that the relay listed at the head of the column is operated and R is used to indicate that the relay is released. It may be noted that all of the thirty-two possible combinations are used in counting up to and including twelve. Even though some of these combinations are transient conditions they cannot appear again in the sequence pattern. It may also be noted that any pulses beyond twelve keep recycling the counter over the eleventh and twelfth pulse combinations:

| | Pulsing Relay L | Counting Relays | | | | | Relay Combination |
|---|---|---|---|---|---|---|---|
| | | P1 | P2 | P3 | P4 | P5 | |
| Seizure | O | R | R | R | R | R | 1 |
| 1st pulse | R | O | R | R | R | R | 2 |
| | O | O | O | R | R | R | 3 |
| 2nd pulse | R | R | O | R | R | R | 4 |
| | R | R | O | O | R | R | 5 |
| | O | R | R | O | R | R | 6 |
| 3rd pulse | R | O | R | O | R | R | 7 |
| | O | O | O | O | R | R | 8 |
| | O | O | O | O | O | R | 9 |
| 4th pulse | R | R | O | O | O | R | 10 |
| | O | R | R | O | O | R | 11 |
| 5th pulse | R | O | R | O | O | R | 12 |
| | R | O | R | R | O | R | 13 |
| | O | O | O | R | O | R | 14 |
| 6th pulse | R | R | O | R | O | R | 15 |
| | O | R | R | R | O | R | 16 |
| | O | R | R | R | O | O | 17 |
| 7th pulse | R | O | R | R | O | O | 18 |
| | O | O | O | R | O | O | 19 |
| 8th pulse | R | R | O | R | O | O | 20 |
| | R | R | O | O | O | O | 21 |
| | O | R | R | O | O | O | 22 |
| 9th pulse | R | O | R | O | O | O | 23 |
| | O | O | O | O | O | O | 24 |
| | O | O | O | O | R | O | 25 |
| 10th pulse | R | R | O | O | R | O | 26 |
| | O | R | R | O | R | O | 27 |
| 11th pulse | R | O | R | O | R | O | 28 |
| | R | O | R | R | R | O | 29 |
| | O | O | O | R | R | O | 30 |
| 12th pulse | R | R | O | R | R | O | 31 |
| | O | R | R | R | R | O | 32 |

When a digit ends, relay L remains operated for a long enough time to permit relay RA to release and relay RA1 to reoperate. Between the release of relay RA and the reoperation of relay RA1, circuits are closed for operating the digit register 220 in accordance with the two-out-of-five code. For example, assume that the digit 5 has been counted. As seen from the above table, relays P1, P2 and P4 are operated and relays P3 and P5 unoperated after five pulses have been counted. Therefore, during the operate time of relay RA1, one circuit will be closed from ground over contact ON–1, conductor 104, contact RA–5, contact P5–10, contact P2–11, contact P2A–4, contact RA1–5 to conductor 211 and a second circuit will be closed from ground on conductor 104 over contact RA–5, contact P5–10, contact P3–9, contact P4–10, contact RA1–4 to conductor 214.

Similarly for other digits, ground is connected to conductors 210, 211, 212, 214 and 217 in pairs, in accordance with the two-out-of-five code, to operate the digit register 220 in accordance with the digit counted. Following is a table showing the relays remaining operated after counting the various digits and the conductors grounded as a result:

| Decimal Pulse | Counting Relays | | | | | Conductors Grounded (Two-out-of-five Code) |
|---|---|---|---|---|---|---|
| | P1 | P2 | P3 | P4 | P5 | |
| 1 | O | O | R | R | R | 210, 211 |
| 2 | R | R | O | R | R | 210, 212 |
| 3 | O | O | O | O | R | 211, 212 |
| 4 | R | R | O | O | R | 210, 214 |
| 5 | O | O | R | O | R | 211, 214 |
| 6 | R | R | R | O | O | 212, 214 |
| 7 | O | O | R | O | O | 210, 217 |
| 8 | R | R | O | O | O | 211, 217 |
| 9 | O | O | O | R | O | 212, 217 |
| 10 | R | R | O | R | O | 214, 217–224 |
| 11 | O | O | R | R | O | 210 |
| 12 | R | R | R | R | O | 210 |

With relay RA released and relay RA1 operated, the locking circuits for the counting relays are opened and the operated counting relays restore, ready for counting another digit.

If eleven pulses or any larger odd number of pulses are counted, relays P1, P2 and P5 will be operated and relays P3 and P4 will be released. Under this condition, conductor 210 will be grounded over contact RA1–6, contact P2A–5, contact P3–11, contact P1–9, contact P5–12, contact RA–6 to ground on conductor 104. If twelve pulses or any larger even number of pulses are counted, relay P5 will be operated and relays P1 to P4 will be released. Under this condition, conductor 210 will be grounded over contact RA1–6, contact P2A–5, contact P3–11, contact P4–11, contact P1–8, contact P5–12, contact RA–6 to ground on conductor 104. As a consequence, only a single relay will be operated in the associated digit register and when this registration is transferred to the marker, as described in the above-identified Busch patent, a significant trouble indication will result.

The register is equipped with a prefix counter 221 which counts a pair of preliminary digits 1 to identify certain operator codes. When the digit 1 is registered, relays P1 and P2 are operated but relay P2A has not yet been operated. Therefore, in the interdigital period ground on conductor 104 is connected over contact RA–5, contact P5–10, contact P2–11 and contact P2A–3 to conductor 222 leading to the prefix counter 221. When the counting relays are released during the interdigital interval, a circuit is closed from ground on conductor 104 over contact P1–11 to the prefix counter to prepare the counter for receiving the second digit 1.

A single digit 0 is also used for calling an operator. As disclosed in the above-identified Busch patent, while the register is waiting for the first digit to be dialed, a registration progress relay AS (not shown) is operated closing contact AS–1. With this contact closed, if the digit 0 is dialed to signal an operator, the counting relays P3 and P5 will be operated and relays P1, P2 and P4 will be released at the end of the digit so that a circuit will immediately be closed from ground on conductor 200, contact P1–7, contact P3–5, contact P4–7, contact P5–7, conductor 224, contact AS–1 to battery through the winding of relay MAN. Relay MAN operates and locks over its contact MAN–1 and contact ON–4 to ground, independent of the registering circuit. At contact MAN–2, the dial-tone circuit will be opened. Conductors 214 and 217 will be grounded in the usual manner during the operate time of relay RA1 but will be without effect. If some digit other than 0 is dialed for the first digit, the registration progress relay AS will be released following the reception of that digit and the relay MAN cannot be operated by the dialing of subsequent 0's.

What is claimed is:

1. A counting relay arrangement for counting series of pulses comprising a two-relay pulse divider and a series of three sequence relays, circuits controlled by said pulse divider for operating said sequence relays in all possible combinations, a set of five output conductors, circuits controlled by said relays for marking said conductors two at a time to register digits from 1 to 0, and an additional circuit controlled by said relays for marking a single one of said conductors as a trouble indication.

2. A digit pulse counting arrangement comprising five relays, two of said relays constituting a pulse divider, a pair of input conductors, means to ground said two input conductors alternately in response to incoming pulses, circuits for operating said pulse divider relays over said input conductors, circuits controlled by said pulse divider relays for operating the remaining three relays in all possible combinations in accordance with the number of incoming pulses, a set of five output conductors, circuits controlled by said relays for marking said output conductors two at a time to register one to ten incoming pulses, and additional circuits controlled by said relays for marking a single one of said conductors to register incoming pulses more than ten in number.

3. A digit pulse counting arrangement comprising five relays, two of said relays constituting a pulse divider, a pair of input conductors, means to ground said two input conductors alternately in response to incoming pulses, circuits for operating said pulse divider relays over said input conductors, circuits controlled by said pulse divider relays for operating the remaining three relays in all possible combinations in accordance with the number of incoming pulses to count a maximum of twelve incoming pulses, a set of five output conductors, circuits controlled by said relays for marking said output conductors two at a time to register one to ten incoming pulses, and additional circuits controlled by said relays for marking a single one of said conductors to register eleven or twelve incoming pulses.

4. A digit pulse counting arrangement comprising five relays, two of said relays constituting a pulse divider, a pair of input conductors, means to ground said two input conductors alternately in response to incoming pulses, circuits for operating said pulse divider relays over said input conductors, circuits controlled by said pulse divider relays for operating the remaining three relays in all possible combinations in accordance with the number of incoming pulses to count a maximum of twelve incoming pulses, a set of five output conductors, circuits controlled by said relays for marking said output conductors two at a time to register one to ten incoming pulses, a first circuit controlled by said relays for marking a single one of said output conductors to register eleven pulses, and a second circuit controlled by said relays for marking said single conductor to register twelve pulses.

5. A digit pulse counting arrangement comprising a two-relay pulse divider and a series of three sequence relays, a pair of input conductors, means to ground said two input conductors alternately in response to incoming pulses, circuits for operating said pulse divider relays over said input conductors, circuits controlled by said pulse divider relays for operating said three sequence relays in all possible combinations in accordance with the number of incoming pulses, means operated at the end of ten pulses to prevent the further operation of said sequence relays, a set of five output conductors, circuits controlled by said pulse divider and said sequence relays for marking said output conductors two at a time to register one to ten incoming pulses, a first circuit controlled by said relays for marking a single one of said output conductors to register eleven pulses, and a second circuit controlled by said relays for marking said single conductor to register twelve pulses, said pulse divider responding to additional pulses to alternately close said first marking circuit and said second marking circuit.

References Cited in the file of this patent

UNITED STATES PATENTS

| | | |
|---|---|---|
| 2,088,793 | Judge | Aug. 3, 1937 |
| 2,114,255 | Powell | Apr. 12, 1938 |
| 2,314,187 | Abbott | Mar. 16, 1943 |
| 2,616,958 | Westerveld | Nov. 4, 1952 |
| 2,623,114 | Low | Dec. 23, 1952 |
| 2,676,313 | Dehn | Apr. 20, 1954 |
| 2,700,146 | Bachelet | Jan. 18, 1955 |